(12) United States Patent
Gil Mollà et al.

(10) Patent No.: US 10,054,106 B2
(45) Date of Patent: Aug. 21, 2018

(54) COUNTERWEIGHT SYSTEMS FOR A WIND TURBINE AND METHODS

(71) Applicant: ALSTOM RENEWABLE TECHNOLOGIES, Grenoble (FR)

(72) Inventors: Isaac Gil Mollà, Nantes (FR); Elsa Rondeleux, Nantes (FR)

(73) Assignee: GE Renewable Technologies Wind B.V., Breda (NL)

( * ) Notice: Subject to any disclaimer, the term of this patent is extended or adjusted under 35 U.S.C. 154(b) by 342 days.

(21) Appl. No.: 14/862,509

(22) Filed: Sep. 23, 2015

(65) Prior Publication Data
US 2016/0090962 A1  Mar. 31, 2016

(30) Foreign Application Priority Data

Sep. 26, 2014 (EP) .................................... 14382370

(51) Int. Cl.
*F03D 1/06* (2006.01)
*F03D 7/02* (2006.01)
*F03D 13/10* (2016.01)

(52) U.S. Cl.
CPC .......... *F03D 1/0658* (2013.01); *F03D 1/0675* (2013.01); *F03D 1/0691* (2013.01); *F03D 7/02* (2013.01); *F03D 13/10* (2016.05); *F05B 2230/61* (2013.01); *Y02E 10/721* (2013.01); *Y02P 70/523* (2015.11)

(58) Field of Classification Search
CPC .... F03D 1/0658; F03D 1/0691; F03D 1/0675; F03D 13/10; F03D 7/02; Y02P 70/523; Y02E 10/721; F05B 2230/61; F05B 2240/916
See application file for complete search history.

(56) References Cited

U.S. PATENT DOCUMENTS 3,782,222 A * 1/1974 Berggren ................ F03D 15/10
                                                      74/590
4,818,004 A * 4/1989 Oswalt ..................... B66C 1/10
                                                      294/67.21
(Continued)

FOREIGN PATENT DOCUMENTS

| DE | 10 2009 011603 | 9/2010 |
| EP | 2 650 537 | 10/2013 |
| WO | WO 2014/076825 | 5/2014 |

OTHER PUBLICATIONS

European Search Report for EP 14382370.6, dated Apr. 16, 2015, 16 pgs.

*Primary Examiner* — Woody Lee, Jr.
*Assistant Examiner* — Adam W Brown
(74) *Attorney, Agent, or Firm* — Dority & Manning, P.A.

(57) ABSTRACT

A counterweight system for a wind turbine is provided. The wind turbine comprises a rotor hub positioned on a wind turbine tower such that the rotor hub is configured to rotate around an axis, the rotor hub comprising one or more mounting surfaces, the counterweight system comprising: The system comprises a beam comprising a connection element adapted to be attached to the mounting surfaces, the beam being provided with a first steering mechanism adapted to control an orientation of the beam with respect to the connection element. Furthermore, the system comprises a counterweight mass coupled to the beam. Moreover, methods for installing blades to a rotor hub of a wind turbine are also provided.

18 Claims, 4 Drawing Sheets

(56) References Cited

U.S. PATENT DOCUMENTS

| | | | |
|---|---|---|---|
| 8,841,794 B2* | 9/2014 | Romeo | F03D 1/0608 |
| | | | 290/55 |
| 9,810,202 B2* | 11/2017 | Falkenberg et al. | F03D 11/00 |
| | | | 416/19 |
| 2004/0253109 A1 | 12/2004 | Wobben | |
| 2009/0159549 A1* | 6/2009 | Trede | B66C 1/108 |
| | | | 212/270 |
| 2013/0272876 A1* | 10/2013 | Falkenberg | F03D 11/00 |
| | | | 416/1 |
| 2015/0275853 A1* | 10/2015 | Canedo Pardo | F03D 1/001 |
| | | | 29/889 |
| 2015/0275854 A1* | 10/2015 | Canedo Pardo | F03D 80/00 |
| | | | 29/889 |

* cited by examiner

COUNTERWEIGHT SYSTEMS FOR A WIND TURBINE AND METHODS

This application claims priority to EP 14382370.6, filed Sep. 26, 2014, the entire contents of which are hereby incorporated by reference for all purposes.

The present disclosure relates to counterweight systems for a wind turbine and methods for installing blades to a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

During installation, one or more blades are to be mounted to the wind turbine hub. The hub generally comprises a plurality of annular mounting flanges with openings and/or a plurality of surfaces prepared for attachment, lifting or manipulation. The blade can comprise a plurality of fasteners, such as bolts, or pins or studs at its blade root. During installation, these fasteners are to be fitted into the openings in the mounting flanges.

The blades may be installed in a variety of ways, e.g. in a substantially vertical manner or substantially horizontally or at other inclined angles. Particularly, in offshore wind turbines, mounting a blade from above the hub may be very complicated, or at least require an enormous crane and jack-up barge. Such an installation method may thus be very expensive and depending on the depth of the sea, the blade size and hub height may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade can be vertically mounted from below. However, in order to be able to perform these operations, the prevailing wind speed has to be below a predetermined value for a prolonged period time. The period of time depends on the expected length of the installation step and a safety factor to be taken into account.

During certain seasons, windows of several hours in which the wind does not reach the predetermined value may not be available very often. In practice, this may mean that personnel and maintenance equipment including e.g. expensive cranes and jack-up barges may be in stand-by during days or even weeks. This can represent an enormous cost.

It is known to mount each of the plurality of blades substantially horizontally or substantially vertically. This means that individual installation steps may require less time and/or may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. The corresponding torque may thus be very high.

The torque may be delivered using the gearbox (when present) with an external power supply for rotating the rotor. Such a system may be used in combination with a locking pin for maintaining the rotor in a desired position for installation. This is not possible in case of directly driven wind turbines as no gearbox is provided between rotor and generator. Even though the generator may be suitable for operating as a motor, it will generally not be able to deliver the required torque to rotate the hub, especially when the hub is unbalanced, i.e. when at least one blade, but not all the blades have been mounted.

It is an object of the present disclosure to provide methods and systems that at least partially reduce one or more of the aforementioned drawbacks leading to improved methods of installing wind turbine blades especially suitable for direct drive wind turbines and offshore direct drive wind turbines.

SUMMARY

In a first aspect, a counterweight system for a wind turbine is provided. The wind turbine comprises a rotor hub positioned on a wind turbine tower such that the rotor hub is configured to rotate around an axis, the rotor hub comprising one or more mounting surfaces. The counterweight system comprises a beam comprising a connection element adapted to be attached to the mounting surfaces, the beam being provided with a first steering mechanism adapted to control an orientation of the beam with respect to the connection element. Furthermore, the system comprises a counterweight mass coupled to the beam.

The use of a counterweight system in order to rotate the rotor hub in a wind turbine may be an advantage. The weight of the counterweight mass located at the counterweight system may provide the torque to rotate the rotor hub. In consequence, one or more blades may be mounted to the rotor hub in a desired position e.g. horizontally, thus the need to reach positions for installing the blades higher than the hub may be avoided. Furthermore, the need of auxiliary tools e.g. a wind turbine generator operated by a motor or an auxiliary gear motor to rotate the rotor hub may be eliminated. In addition, the blades may be mounted one by one, at higher wind speeds. More time windows for such installations may thus be available, thus shortening installation time and reducing installation cost.

The counterweight system is provided with a connection element adapted to be attached to the mounting surfaces of the rotor hub. The connection element may be provided with a first steering mechanism. In this way, different angular configurations of the counterweight with respect to the mounting surfaces of the rotor hub may be achieved, and therefore the counterweight may be positioned to apply the necessary torque to rotate the rotor hub.

In some examples, the first steering mechanism may comprise a hinge element configured to be locked in a plurality of determined positions. The hinge element may be a passive element, thus the repositioning of the blade holder (and thus the blade) with respect to the connection element may be achieved using a lifting equipment e.g. a crane.

In a second aspect, a method for installing a blade to a rotor hub of a wind turbine is provided. The wind turbine comprises a rotor hub positioned on a wind turbine tower such that the rotor hub is configured to rotate around an axis, the rotor hub comprising one or more blade mounting surfaces, the method comprises: Rotating the rotor hub around the axis to a position suitable to mount the first blade in a substantially horizontal position by using a counterweight system as hereinbefore described. Providing a blade holder for holding a blade, wherein the blade holder comprises a lifting equipment attachment, the blade holder being provided with a steering mechanism adapted to control an orientation of the blade holder with respect to the lifting equipment attachment. The method further includes providing a blade holder for holding a blade, wherein the blade holder comprises a lifting equipment attachment, the blade holder being provided with a steering mechanism adapted to control an orientation of the blade holder with respect to the lifting equipment attachment. Then, lifting equipment for lifting the blade holder is provided. The blade is attached to the blade holder. The lifting equipment is connected to the blade holder using lifting equipment attachment of the blade holder. The blade holder is hoisted with the blade towards the rotor hub with the lifting equipment. Then, the blade is mounted to the rotor hub.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
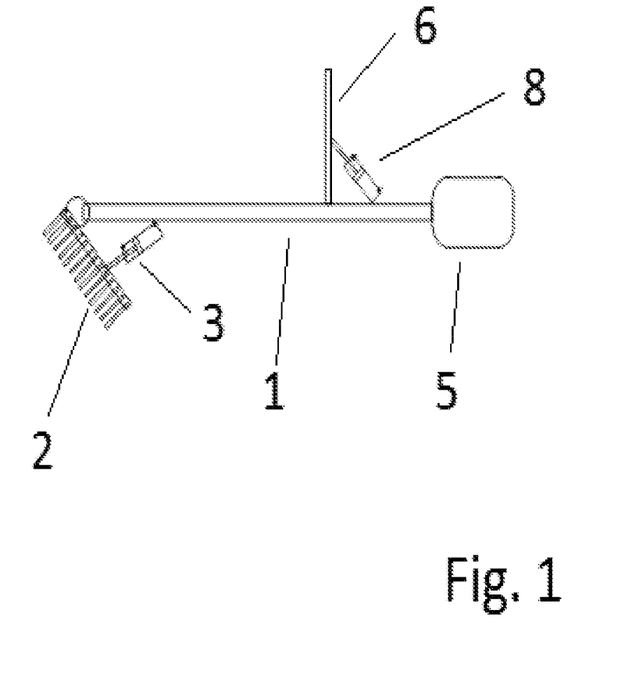
FIG. 1 schematically represents a counterweight system according to an example.

The FIG. 1 schematically represents a counterweight system according to an example. The counterweight system is shown having a beam 1. The beam 1 may have attached at or near a distal end a counterweight mass 5. The beam may 1 be provided with a first steering mechanism 3 adapted to control the orientation of the beam 1 with respect to a connection element 2. In some examples, the counterweight mass 5 may be displaced along the beam 1, thus a variation in the torque may be obtained.

The connection element 2 may be configured to be connected to a mounting surface of the rotor hub. This mounting surface may be a mounting flange or a part of a pitch system for mounting a root portion of a blade. In other examples, the mounting surfaces may comprise dedicated, especially prepared attachments for the sole purpose of attaching a counterweight system. In yet further examples, attachments or surfaces prepared for lifting and manipulation of the rotor hub could be used for mounting the counterweight system.

The connection element 2 may comprise a mounting flange (e.g a ring) with studs or bolts configured to be attached to a mounting surface although some other elements are possible and may be provided at or near the proximal end of the beam 1.

The first steering mechanism 3 e.g. a levelling system provided with a hydraulic cylinder or a hinge element configured to be locked in a plurality of determined position may be located at the lower part of the beam 1. It may be located at or near a proximal end of the beam. The first steering mechanism 3 may be attached between the lower part of the beam 1 and an upper portion of the connection element 2. The first steering mechanism 3 may be configured to rotate the beam (and thus the counterweight mass 5) at different angles with respect to the connection element 2. Furthermore, the first steering mechanism may be configured to be locked in a determined position. This way, once the counterweight system is attached to the rotor hub (not shown) using the connection element 2, a torque may be induced to the rotor hub (not shown) and the rotation of the rotor hub to an intermediate desired position may be achieved.

Furthermore, once the intermediate desired position is achieved, the beam 1 (and thus the counterweight mass 5) may again be repositioned in another position e.g. a horizontal position. Therefore, a torque may be induced again to the rotor hub (not shown) and the rotation of the rotor hub to a first desired position may be achieved.

A second steering mechanism 8 e.g. a levelling system provided with a hydraulic cylinder or a hinge element configured to be locked in a plurality of determined position may be located at the upper part of the beam 1. The second steering mechanism 8 may be attached between a lifting equipment attachment 6 and an upper portion of the beam 1. The second steering mechanism 8 may be configured to rotate the beam 1 at different angles with respect to the lifting equipment attachment 6. This way, the counterweight system may be installed at different angles (with respect to a horizontal plane).

The first and/or second steering mechanisms may comprise pneumatic, or hydraulic or electric actuators, e.g. a hydraulic piston. Alternatively, the first steering mechanism may comprise a mechanical articulation e.g. a hinge. Additionally, the first and/or second steering mechanism may be configured to be locked in a determined position.

The lifting equipment attachment 6 may be configured to be attached to a lifting equipment (not shown), thus the lifting equipment attachment (and thus the counterweight system) may be hoisted. The lifting equipment may comprise e.g. a crane, or a jack-up barge with a crane.

Figures 2A, 2B:
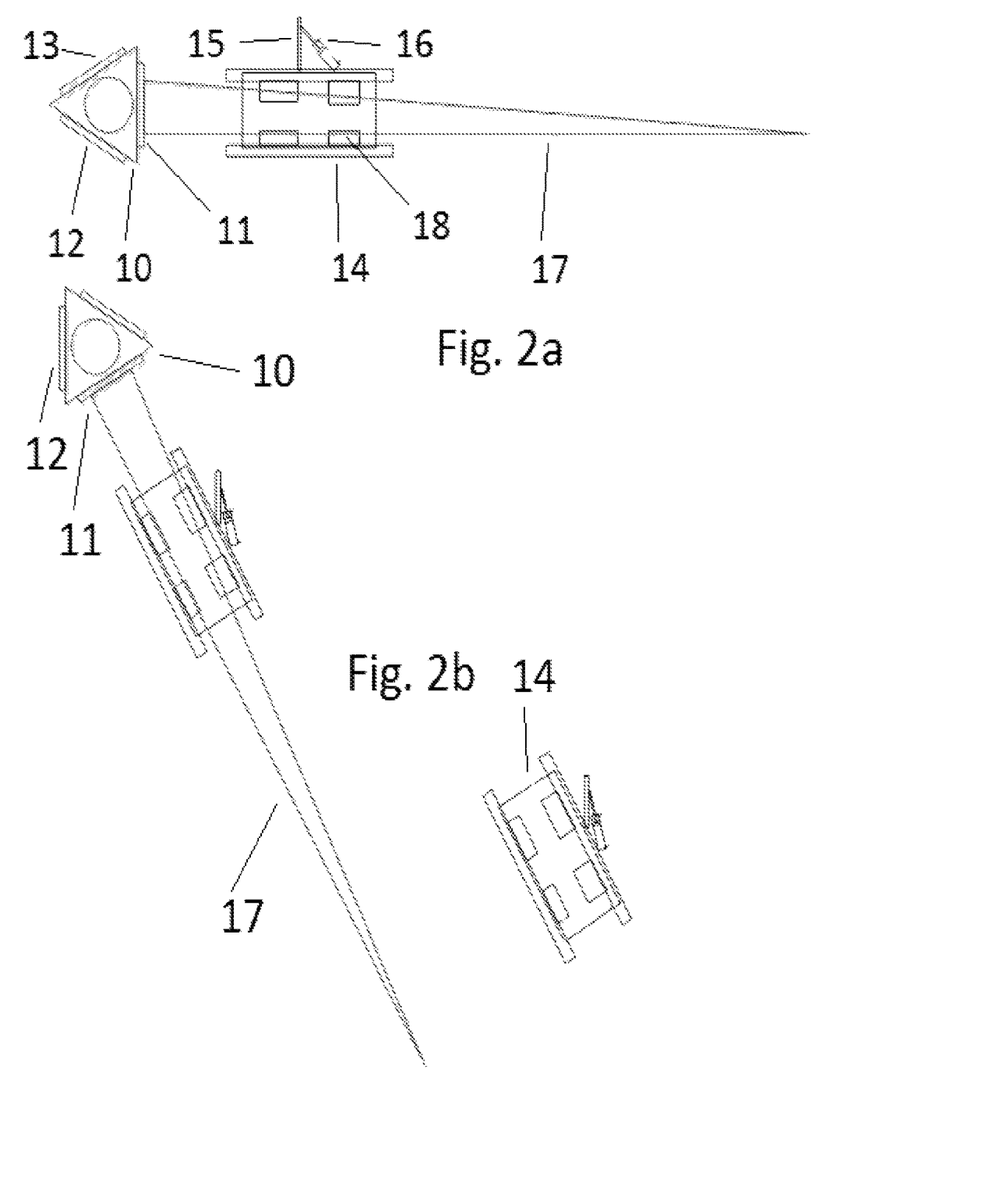
FIGS. 2a-2b schematically illustrate a sequence of situations occurring during the performance of a method for installing a first blade to a rotor hub of a wind turbine according to an example.

FIGS. 2a-2b schematically illustrate a sequence of situations that may occur during the performance of a method for installing a first blade of a wind turbine according to an example. Same reference numbers denote the same elements. The method is described below with reference to the sequences of situations illustrated by FIGS. 2a-2b.

In FIG. 2a, the rotor hub 10 may be mounted e.g. on a nacelle (not shown) on top of a wind turbine tower in such a way that the rotor hub 10 is rotatable around one axis with respect to the nacelle. The rotor hub 10 is shown comprising a first mounting surface 11 adapted to receive the blade root, a second mounting surface 12 adapted to receive the blade root and a third mounting surface 13 adapted to receive the blade root. Each of these mounting surfaces 11, 12, 13 may comprise a pitch system (not shown) for rotating a blade to be mounted to the mounting surfaces. The rotation may be about a pitch axis i.e. a longitudinal axis of the blade when mounted to the hub.

The rotor hub 10 may be configured to carry a plurality of blades. Only one blade 17 is shown in FIG. 2a.

The FIG. 2a illustrates an initial situation. In this initial situation, the rotor hub 10 may be situated in a position which may be appropriate for installing the first blade 17.

A way to define these positions is with reference to an angular position of the hub. The 0° position for a blade may be regarded as a position in which it is arranged substantially vertically, pointing upwards. The mounting surfaces are thus arranged in the specific situation shown at 90° (mounting surface 11), 210° (mounting surface (12)) and 330° (or −30° for mounting surface 13).

A first rotation of the hub (not carrying any blades) to a position suitable to mount the first blade in a substantially horizontal position may be performed using the counterweight system. Alternatively, the first rotation of the hub may be carried out using the generator or some auxiliary driving equipment which is suitable for rotating a hub carrying no blades (but may not necessarily be powerful enough to rotate an imbalanced hub with a single blade or two blades).

A blade holder 14 may be attached to the first blade 17. The lifting equipment (not shown) may be attached to the blade holder 14 using the lifting equipment attachment 15 of the blade holder. The blade holder 14 and the blade 17 may be brought near the rotor hub 11 using the lifting equipment. The blade holder 14 (and thus the blade 17) may be situated in substantially horizontal position using the steering mechanism 16 of the blade holder e.g. a levelling system provided with a hydraulic cylinder or a hinge element configured to be locked in a plurality of determined position.

The blade holder 14 may be provided as a lifting bracket with a plurality of pads 18 as depicted in FIG. 2b, thus the stability of the blade once it is attached to the blade holder 2 may be improved. Alternately, the blade holder 14 may include one or more controllable slings arranged around the blade.

The blade holder 14 (and thus the first blade 17) may be brought into contact with the rotor hub 10 using the lifting equipment (not shown). In this way, the blade root portion of the first blade 17 may be attached to the first mounting surface 11 of the rotor hub 10. The first blade 17 may thus be mounted horizontally. Mounting blades in a substantially horizontal manner is a preferred option since such an operation may generally be carried out at higher wind speeds than other operations, and importantly there is no need to lift a blade at substantial height above the hub. But other non-horizontal orientations may be possible depending on e.g. the particular configuration of the wind turbine and on the particular configuration of the blade holder.

The FIG. 2b illustrates that the first blade 17 is mounted to the first mounting surface 11 (and thus the rotor hub 10). A locking mechanism of the rotor hub may be disconnected. This way, once the first blade 17 is mounted, the rotor hub 10 may rotate in a clockwise direction e.g. towards a position in which the second mounting surface is arranged such as to receive a blade in a substantially horizontal manner (i.e. at 270°). At that point, the locking mechanism could be activated.

Alternatively, the locking mechanism (not shown) of the rotor hub 10 may be maintained activated, thus the rotor hub 10 may remain in a position wherein mounting surface 11 is at the 90° position. The mounting surface 12 is then at 210° position, which could also be appropriate to install the second blade using a suitable blade holder. The blade holder 14 may be detached from the first blade 17. Therefore, the blade holder 14 may be ready for the installation of a second blade.

Figure 2C:
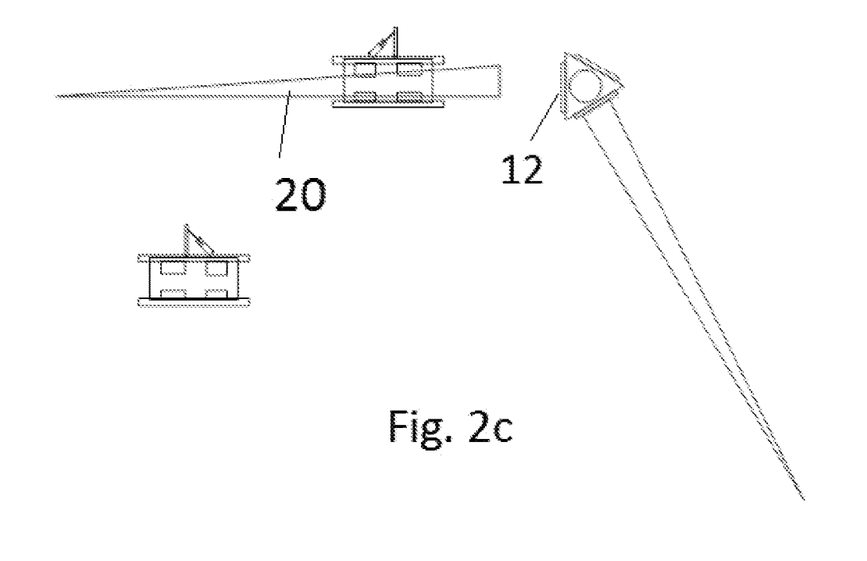
FIG. 2c schematically illustrates a situation occurring during the performance of a method for installing a second blade to a rotor hub of a wind turbine according to an example.

FIG. 2c schematically illustrates a situation that may occur during the performance of a method for installing a second blade of a wind turbine according to an example. Prior to this, the hub may be unlocked in order to cancel the locking of the hub occurred in the previous installation of the first blade. In FIG. 2c, same elements denote the same numbers as described in FIGS. 2a-2b.

For the sake of simplicity, references to times indicated by an "imaginary" clock may also be included in descriptions about FIG. 2c. The references to times may be used to indicate approximate positions of the blade and/or the counterweight system by considering blade and/or the counterweight system as an hour hand of the "imaginary" clock. Thus, for example, reference may be made to the blade and/or the counterweight system as pointing to 6 o'clock to indicate that the blade and/or the counterweight system is vertically pointing downwards.

The FIG. 2c illustrates a situation in which the rotor hub may be situated in a position which may be appropriate for installing the second blade. The blade holder may be attached to the second blade. The lifting equipment (not shown) may be attached to the blade holder using the lifting equipment attachment. The blade holder and the second blade may be brought near the rotor hub using the lifting equipment (not shown). The blade holder (and thus the second blade) may be situated at the 9 o'clock position using the steering mechanism of the blade holder e.g. a levelling system provided with a hydraulic cylinder or a hinge element configured to be locked in a plurality of determined position. This way, the second blade 20 may be mounted to the second mounting surface 12. The locking mechanism (not shown) of the rotor hub may be activated, thus the rotor hub may remain in a position wherein the second mounting surface 12 is at the 9 o'clock position.

Alternatively, once the second blade 20 is mounted, the rotor hub may be substantially balanced. This would be the case when the first blade may be situated at the 4 o'clock position and the second blade may be situated at the 8 o'clock position, thus the substantially balanced position of the rotor hub may be achieved. In a previous step therefore, the hub would be positioned and locked in a different, appropriate orientation.

FIGS. 2d-2i schematically illustrates a sequence of situations that may occur during the performance of a method for installing a third blade of a wind turbine according to an example. Prior to this, the hub may be unlocked in order to cancel the locking of the hub occurred in the previous installation of the second blade. In FIGS. 2d-2i, same elements denote the same numbers as described in FIGS. 2a-2b.

Figure 2D:
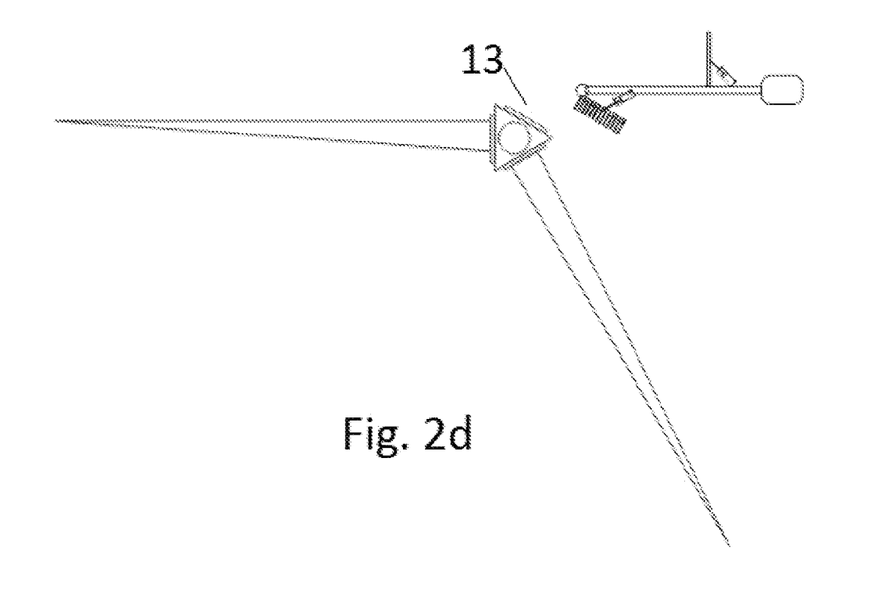
FIGS. 2d-2i schematically illustrate a sequence of situations occurring during the performance of a method for installing a third blade to a rotor hub according to an example.

The FIG. 2d illustrates an initial situation for the installation of the third blade. In this initial situation, the rotor hub may be situated in a position which may not be appropriate for installing the third blade (not shown). In this situation, a crane or other lifting equipment would have to lift the blade to much higher heights in order to mount the blade from above the hub.

According to this example, the lifting equipment (not shown) may be attached to the counterweight system using the lifting equipment attachment of the counterweight system. The counterweight system may be brought near the rotor hub using the lifting equipment (not shown).

Figures 2E, 2F, 2G, 2H, 2I:
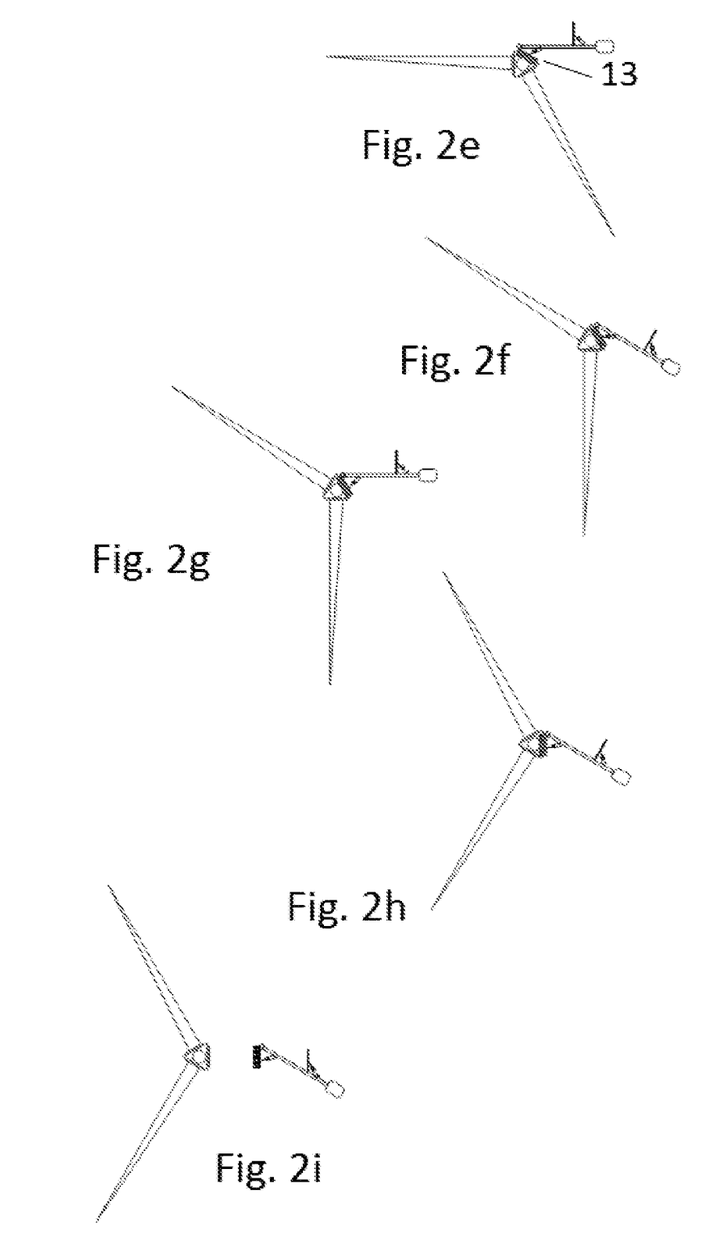

In FIG. 2e, the counterweight system may comprise a connection element adapted to be attached to a further mounting surface 13. In this specific example, the mounting surface 13 may be a mounting flange or a part of a pitch system on the hub that is suitable for receiving a blade root portion. This way, a counterweight system may be attached to the third mounting surface 13 of the rotor hub.

In FIG. 2f, the rotor hub 10 may be rotated in a clockwise direction using the counterweight mass to an intermediate position. The extra weight of the counterweight system may induce a torque (due only to weight loads) in the hub. Therefore, no additional systems e.g. a wind turbine generator operated by a motor, an auxiliary gear motor may be necessary for rotating the rotor hub. Once the intermediate position is achieved, the rotor hub may be prevented from rotating further by engaging the locking mechanism using, e.g. an actuator for selectively switching the hub between an engaged position for rotatably fixing the hub to an axle and a disengaged position for freeing rotation of the hub.

In FIG. 2g, the beam (and thus the counterweight mass) of the counterweight system may be rotated to a substantially horizontal position using the first steering mechanism and/or the lifting equipment. This way, the arm of the weight of the counterweight mass can be increased and the counterweight system may again induce a torque (due only to weight loads) in the rotor hub.

In FIG. 2h, as commented above in the FIG. 2g, the extra weight of the counterweight mass of the counterweight system may again induce a torque (due only to weight loads) in the hub sufficient to overcome the counter torque caused by the other blades, which torque causes clockwise rotation of the hub from the position shown in FIG. 2g to the position shown in FIG. 2h. The rotor hub may again be prevented from rotating by engaging the locking mechanism using, e.g. an actuator for selectively switching the hub between an engaged position for rotatably fixing the hub to an axle and a disengaged position for freeing rotation of the hub. The locking mechanism of the hub may ensure that the hub remains in the first desired position. This way, the rotor hub may be situated in a first desired position for mounting the third blade.

In FIG. 2i, the counterweight system may be separated from the rotor hub using the lifting equipment. The counterweight system may be brought to a surface using the lifting equipment (not shown). In this final situation, the rotor hub may be situated in a position which may be appropriate for installing the third blade. The blade holder may be attached to the third blade. The lifting equipment (not shown) may be attached to the blade holder using the lifting equipment attachment of the blade holder. The blade holder and the blade may be brought near the rotor hub using the lifting equipment. The blade holder (and thus the blade) may be situated in substantially horizontal position using the steering mechanism of the blade holder e.g. a levelling system provided with a hydraulic cylinder or a hinge element configured to be locked in a plurality of determined position. In this way, the blade root portion of the third blade may be attached to the third mounting surface of the rotor hub. The third blade may thus be mounted horizontally. Mounting blades in a substantially horizontal manner is a preferred option since such an operation may be carried out at higher wind speeds than other operations, and importantly there is no need to lift a blade at substantial height above the hub. But other non-horizontal orientations may be possible depending on e.g. the particular configuration of the wind turbine Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A counterweight system for a wind turbine, the wind turbine comprising a rotor hub positioned on a wind turbine tower such that the rotor hub is configured to rotate around an axis, the rotor hub comprising one or more blade mounting surfaces, the counterweight system comprising:
   a beam;
   a connection element adapted to attach to the mounting surfaces, the connection element configured at a proximal end of the beam;
   a first steering mechanism adapted to control an orientation of the beam with respect to the connection element, the first steering mechanism connected between the connection element and the beam;
   a counterweight mass coupled to a distal end of the beam;
   a lifting equipment attachment configured on the beam intermediate of the proximal and distal ends of the beam; and
   a second steering mechanism configured between the lifting equipment attachment and the beam to control an orientation of the beam with respect to the lifting equipment attachment.

2. The counterweight system for a wind turbine according to claim 1, wherein the first steering mechanism comprises one or more actuators operated by electric current, hydraulic fluid pressure or pneumatic pressure.

3. The counterweight system for a wind turbine according to claim 1, wherein the first steering mechanism comprises a hinge element configured to lock in a plurality of determined positions.

4. The counterweight system for a wind turbine according to claim 1, wherein the beam is a telescopic beam such that a distance between the connection element, located at the proximal end of the beam, and the distal end of the beam can be varied.

5. A method for installing a blade on a rotor hub of a wind turbine with the counterweight system according to claim 1, the rotor hub being positioned on a wind turbine tower such that the rotor hub is configured to rotate around an axis, the rotor hub comprising one or more blade mounting surfaces, the method comprising the steps of:
   with the counterweight system, rotating the rotor hub around the axis to a position suitable to mount the first blade in a substantially horizontal position;
   providing a blade holder for holding the first blade, wherein the blade holder comprises a lifting equipment attachment, the blade holder provided with a steering mechanism adapted to control an orientation of the first blade, when held by the blade holder, with respect to the lifting equipment attachment;
   providing lifting equipment for lifting the blade holder;
   attaching the blade holder to the first blade;
   connecting the lifting equipment to the blade holder using the lifting equipment attachment of the blade holder;
   hoisting the blade holder with the first blade towards the rotor hub using the lifting equipment;
   mounting the first blade to the rotor hub.

6. The method according to claim 5, wherein the blade holder comprises one or more pressure pads holding the first blade.

7. The method according to claim 6, wherein the blade holder comprises a lifting bracket that substantially clamps the first blade when the first blade is attached to the blade holder.

8. The method according to claim 6, wherein the blade holder comprises one or more controllable slings arranged around the first blade when the first blade is attached to the blade holder.

9. The method according to claim 5, further comprising:
attaching the blade holder to a second blade;
hoisting the blade holder with the second blade towards the rotor hub using the lifting equipment; and
mounting the second blade to the rotor hub.

10. The method according to claim 9, wherein before mounting the second blade to the rotor hub, the rotor hub is rotated around the axis to a position suitable to mount the second blade in a substantially horizontal position, wherein the mass of the first blade induces a torque on the rotor hub, which causes the rotor hub to rotate around the axis.

11. The method according to claim 10 further comprising
attaching the lifting equipment to the counterweight system using the lifting equipment attachment of the counterweight system;
hoisting the counterweight system towards the rotor hub using the lifting equipment;
attaching the counterweight system to the blade mounting surface using the connection element;
using the mass of the counterweight, rotating the rotor hub to an intermediate position for mounting a third blade to the rotor hub;
rotating the counterweight to an upward position using the first steering mechanism;
using the counterweight mass, rotating the rotor hub to a first desired position for mounting the third blade to the rotor hub;
using a locking system, locking the hub in rotation after the hub has rotated to the first desired position;
detaching the counterweight system from the rotor hub;
attaching the blade holder to the third blade;
connecting the lifting equipment to the blade holder using the lifting equipment attachment of the blade holder;
hoisting the blade holder with the third blade towards the rotor hub using the lifting equipment;
mounting the third blade to the rotor hub.

12. The method according to claim 11, further comprising after rotating the rotor hub using the mass of the counterweight to an intermediate position, blocking the rotor hub using a locking system for locking the hub.

13. A counterweight system for a wind turbine, the wind turbine comprising a rotor hub positioned on a wind turbine tower such that the rotor hub is configured to rotate around an axis, the rotor hub comprising one or more blade mounting surfaces, the counterweight system comprising:
a beam;
a connection element configured on the beam and adapted to attach to the blade mounting surfaces,
a first steering mechanism connected between the connection element and the beam and adapted to control an orientation of the beam with respect to the connection element;
a lifting equipment attachment configured on the beam;
a second steering mechanism connected between the lifting equipment attachment and the beam and adapted to control an orientation of the beam with respect to the lifting equipment attachment; and
a counterweight mass coupled to the beam.

14. The counterweight system according to claim 13, wherein the first steering mechanism comprises one or more actuators operated by electric current, hydraulic fluid pressure or pneumatic pressure.

15. The counterweight system according to claim 13, wherein the first steering mechanism comprises a hinge element configured to lock in a plurality of determined positions.

16. The counterweight system according to claim 13, wherein the second steering mechanism comprises one or more actuators operated by electric current, hydraulic fluid pressure or pneumatic pressure.

17. The counterweight system according to claim 13, wherein the first steering mechanism is provided at a proximal end of the beam.

18. The counterweight system according to claim 13, wherein the beam is a telescopic beam such that a distance between the connection element, located at a proximal end of the beam, and a distal end of the beam can be varied.

* * * * *